(12) United States Patent
Jeanseau

(10) Patent No.: US 6,174,342 B1
(45) Date of Patent: Jan. 16, 2001

(54) HIGH FILTER EFFICIENCY, LOW ENERGY CONSUMPTION, AND LOW NOISE FAN FILTER UNIT

(75) Inventor: Peter Jeanseau, Anaheim, CA (US)

(73) Assignee: HEPA Corporation, Anaheim, CA (US)

(*) Notice: Under 35 U.S.C. 154(b), the term of this patent shall be extended for 0 days.

(21) Appl. No.: 09/347,442

(22) Filed: Jul. 2, 1999

Related U.S. Application Data (60) Provisional application No. 60/097,695, filed on Aug. 24, 1998, and provisional application No. 60/130,091, filed on Apr. 20, 1999.

(51) Int. Cl.[7] ................................................. B01D 46/10
(52) U.S. Cl. .......................... 55/385.2; 55/426; 55/438; 55/444; 55/463; 55/473; 96/385
(58) Field of Search .................. 55/385.2, 426, 55/437, 438, 462, 463, 444, 446, 473; 96/380, 381, 384, 385

(56) References Cited

U.S. PATENT DOCUMENTS

| | | | |
|---|---|---|---|
| 2,704,504 | * 3/1955 | Wilkening . | |
| 3,744,222 | * 7/1973 | Delao | 55/446 |
| 4,560,395 | * 12/1985 | Davis | 55/385.2 |
| 4,790,863 | * 12/1988 | Nobiraki et al. | 55/473 |
| 5,085,057 | * 2/1992 | Thompson et al. . | |
| 5,141,540 | * 8/1992 | Melmus | 55/473 |
| 5,155,876 | * 10/1992 | Whitaker | 55/276 |
| 5,470,363 | * 11/1995 | Leader et al. | 55/438 |

* cited by examiner

*Primary Examiner*—Christopher Upton
(74) *Attorney, Agent, or Firm*—Louis J. Bachand

(57) ABSTRACT

A fan filter unit for clean rooms has baffle structures sized and placed to limit the paths of entry of air flow from the unit motorized fan to the outlet ports, the baffle structures extending for a vertical height sufficient to avoid reversal of air flow within the enclosure for lower energy requirements in the unit while controlling noise levels and keeping BTU output low.

31 Claims, 9 Drawing Sheets

HIGH FILTER EFFICIENCY, LOW ENERGY CONSUMPTION, AND LOW NOISE FAN FILTER UNIT

REFERENCE TO RELATED APPLICATIONS

This application claims the benefit of U.S. Provisional Applications Ser. No. 60/097,695 filed Aug. 24, 1998, and Ser. No. 60/130,091 filed Apr. 20, 1999.

BACKGROUND OF THE INVENTION

1. Field of the Invention

This invention relates to fan filter units useful in clean rooms and like applications. More particularly, the invention relates to a fan filter unit that simultaneously achieves all the major objectives for such a unit:

1. Filtration efficiency of 99.999% at 0.12 micron particles, at
2. Air flows of about 90 FPM,
3. Energy usage of about 100 watts, and
4. Lower BTU output for reduced air conditioning load.

Fan filter units typically are suspended individually or in banks above a workspace, each individual fan filter unit combines a motorized fan, a fan enclosure supporting the fan, and filter media in a filter unit downstream from the fan enclosure all arranged to introduce, e.g. HEPA or ULPA filter-processed air into the workspace environment. The invention advantageously uses a filter pack of relatively increased depth, e.g. 5 inches of depth and greater, no metal separators, and increased pleat count, e.g. 5 to 7 pleats per inch, for maximum energy efficiency. Prior art fan filter units use more energy, are less efficient, and comprise, typically, less deep packs, e.g. 2–4 inches in depth.

2. Related Art

Known filter fan units are desirably improved in terms of filtration efficiency, quietness of operation and energy efficiency including both energy consumed directly by the filter units to drive the fans and energy consumed indirectly by the units through heat output into the air-conditioned room. Achieving the one should not detract from achieving the other. Presently popular fan filter units use trough-like transverse baffles to redirect the air flow from a first direction, generally radially outward from the fan, to a second, opposite direction, generally toward the fan and within the height of the filter fan unit enclosure, see generally U.S. Pat. No. 5,470,363 to Leader et al. Reversing flow will usually entail excess energy consumption and prevent achieving of the desired low energy consumption of about 100 watts or less.

SUMMARY OF THE INVENTION

The present invention uses linear, unidirectional flow of pressurized air from a motorized fan through perimetrically distributed outlet ports. The occurrence of backflows and the backpressure development common in reverse flow devices like that shown in U.S. Pat. No. 5,470,363 and the concomitant unnecessarily high energy consumption is avoided in the invention. Linear, unidirectional flow of pressurized air in the present invention derives from use of baffle structures in advance of the outlet ports, not within the ports, and the use of baffle structures that direct all air flow linearly through the fan enclosure outlet ports. Linear air flow is obtained by extending the baffle structures vertically from about 25% of the enclosure height to the full enclosure height, i.e. from the bottom wall to top wall of the enclosure, giving them a wedge shape that is conducive to smooth air flow, and extending them laterally for at least substantially the width of the outlet ports along their respective side walls. Thus avoided is a reverse flow of air within the height of the filter fan unit enclosure and within the port. Baffle structures extending at least about 25% of the enclosure height limit air flow to lateral (from the side) flows and "waterfall" flows over the baffle structure into the port, all linear flows, while baffles the full height of the enclosure limit air flow to paths extending laterally about the baffle structures. Both types of flow ensure the absence of reverse air flow within the fan surrounding enclosure. The baffles are suitably covered with sound-absorbing material such as foam and, with the walls of the enclosure, define a non-straight air flow path to control and absorb any noise generated within the enclosure. Typical of the prior art is the fan filter unit shown in the above-mentioned U.S. Pat. No. 5,470,363. There the fan filter unit has an integrated fan filter unit and filter. The pressurized air from the centrally located fan is redirected from its normal centrifugal path upward by a deflector to provide a separate path below the deflector for the air to flow to the filter. The air flow path is thus reversed within the fan enclosure and above the filter, and within the port since the trough-shaped baffle is within the outlet port for air flow from the fan. While the noted patent provides a curvilinear guide defined by the trough to ease the flow transition from one direction to another, the flow direction is undoubtedly reversed and this requires more energy than a linear, or non-reversed path. The industry desires lower energy costs and units using 100 watts or less have been a major goal in the industry. The present invention through creation of a linear, non-reversing air flow path that has the pressurized air enter the fan enclosure outlet ports only from directly above and/or the sides and other means to be described hereinafter reaches this goal, while maintaining a high filtering efficiency of 99.999% at 0.12 micron particle size, air flows of 90 FPM, and a reduced BTU output of approximately only 200 BTU/hr to lessen the refrigeration load in the clean room.

It is an object, therefore, of the present invention to provide an improved fan filter unit for filtering air entering a clean room, a surgery, or other meticulously controlled environment. It is a further object to provide fan filter units that are more filtering-efficient, more energy efficient to lower electrical costs, less demanding of cooling capacity, and less noise generating for a quieter workplace; and withal simply installed. A still further object is to provide a fan filter unit that uses a system of baffles arranged to conduct linear air flow laterally or vertically into outlet ports from the fan enclosure and to block reverse flows in the enclosure or in the outlet port where the air is returned in the direction whence it came. Another object is to provide a fan filter unit achieving higher filtering efficiency and increased energy efficiency through the use of separator-less filter media packs of increased pleat depth and greater pleat density. A further object is to provide a mating fan filter unit enclosure and filter media containing frame that are conjoined above the filter media to define a plenum, one or the other of the enclosure and frame carrying air flow distributors opposite the outlet ports.

These and other objects of the invention to become apparent hereinafter are realized in a higher filtering efficient, lower energy consuming, less heat generating, and lower noise generating fan filter unit for flowing air filtered through a higher efficiency particulate air filter into a clean room, the fan filter unit being normally horizontally disposed and comprising a longitudinally and laterally extended enclosure having an air inlet and an air outlet, a high efficiency particulate air filter unit in air-flow communication with the enclosure outlet across a plenum defined by the enclosure and the air filter unit, a motorized fan in air flow communication with the enclosure inlet and the outlet, the fan being supported centrally within the enclosure, the enclosure outlet comprising a longitudinally spaced ports and laterally spaced ports, the ports lying in a normally horizontal common port plane below the fan and collectively being of sufficient cross-sectional area to pass without substantial back pressure the air flow generated by the motorized fan, individual baffle structures extending substantially normal to the common port plane adjacently before each port and between the fan and the port, the baffle structures being arranged to block all direct air flow from the motorized fan into the ports, whereby air flow from the ports is linear and free of reversal in flow direction within the enclosure and within the ports.

In this and like embodiments, typically, the enclosure comprises side walls, a top wall defining the inlet and a bottom wall defining the outlet ports, the air filter unit comprising a frame attached to the fan unit, and a filter, the filter being spaced from the enclosure bottom wall in plenum-defining relation, the baffle structures extend from the enclosure bottom wall vertically a height sufficient to effect the blocking of all direct air flow from the motorized fan into the ports, the baffle structures extend from the enclosure bottom wall vertically a height of at least 25% of the distance between the bottom wall and the enclosure top wall, or the baffle structures extend from the enclosure bottom wall to the enclosure top wall, the laterally spaced ports have individual baffle structures of a V-shape in a plane parallel to the plane of the ports, the V-shape being open to the motorized fan, the longitudinally spaced baffle structures are triangular in cross-section in a plane parallel to the plane of the outlet ports, the baffle structure bases being immediately adjacent their respective ports, the laterally spaced ports have individual baffle structures of a V-shape in a plane parallel to the plane of the ports, the V-shape being open to the motorized fan, and the enclosure side walls are of substantially the same length, the longitudinally spaced baffle structures being triangular in cross section and having their bases immediately adjacent their respective ports.

In a further embodiment, the invention provides a high filtering efficiency, low energy, low noise fan filter unit for flowing air filtered through a high efficiency particulate air filter into a clean room comprising an enclosure having side walls, a top wall defining an air inlet and a bottom wall defining a plurality of laterally and longitudinally spaced outlet ports, the side walls being adapted to attach an air filter unit including a filter to be spaced from the enclosure bottom wall in plenum defining relation, and a plurality of air flow distributors supported between the filter unit bottom wall and the air filter, the air flow distributors being apertured and arranged to guide air flow from each outlet port to the filter.

In this and like embodiments, typically, there is further included an air filter unit, and the enclosure is separately formed from the air filter unit, the enclosure having a skirt continuation of the side walls beyond the bottom wall for enclosing the plenum, the air flow distributors being supported by the enclosure skirt within the plenum. Or, the air flow distributors are supported by the air filter unit within the plenum. Typically, an air filter unit is included that comprises a unit frame and a filter comprising a filter media pack sealably contained within said frame, said filter media pack having no separators, a pack depth of about 5 inches and a pleat density of about 5–7 pleats per inch.

The invention further provides a fan filter unit comprising an enclosure having side walls, a top wall defining an inlet and a bottom wall defining a plurality of laterally and longitudinally spaced outlet ports, the side walls being adapted to attach an air filter unit including a filter to be spaced from said enclosure bottom wall in plenum defining relation, and a plurality of air flow distributors supported between said filter unit bottom wall and the air filter said air flow distributors being apertured and arranged to guide air flow from each said outlet port to said filter, there is further included the air filter unit, and the enclosure is separately formed from the filter unit, and the enclosure has a skirt continuation of the side walls beyond the bottom wall for enclosing the plenum, the air flow distributors being supported by the enclosure skirt within the plenum, or the air flow distributors are supported by the air filter unit within the plenum.

In a further embodiment, the air filter unit comprises a unit frame and a filter media pack sealably contained within the frame, the filter comprising a filter media pack having no separators, a pack depth of about 5 inches and a pleat density of about 5–7 pleats per inch.

In a still further embodiment, the invention provides a high filtering efficiency, low energy, low noise fan filter unit for flowing air filtered through a high efficiency particulate air filter into a clean room, the fan filter unit comprising a longitudinally and laterally extended enclosure comprising four sides, a top wall and a bottom wall, a central air inlet in the top wall, a series of perimetrically distributed air outlet ports through the bottom wall, a skirt continuation of the enclosure side walls beyond the bottom wall, a high efficiency particulate air filter unit comprising a frame attached to the enclosure skirt continuation, a high efficiency particulate air filter sealably mounted within the frame and defining a plenum with the enclosure bottom wall, a motorized fan in air flow communication with the enclosure inlet and the plenum through the outlet ports, the fan being supported centrally within the enclosure, the outlet ports collectively being of sufficient cross-sectional area to pass without substantial back pressure the air flow generated by the motorized fan, an individual baffle structure adjacent each the outlet port, the baffle structures extending vertically a height equal to the distance between the enclosure bottom wall and the enclosure top wall, whereby the outlet ports are closed by adjacent baffle structure to all but lateral entry of air flow from the motorized fan, air flow from the ports thereby being linear and free of reversal in flow direction within the enclosure and within the ports.

In this and like embodiments, typically, the enclosure side, top and bottom walls and the baffle structures define air directing surfaces, the air directing surfaces being covered with sound-absorbing medium, the enclosure skirt continuation terminates in an inwardly turned flange, the filter unit frame having a shoulder abutting the flange, and including also a fastener attaching the filter unit shoulder to the skirt continuation flange in abutting relation, the outlet ports are sized and located to direct motorized fan pressurized air within the enclosure substantially uniformly to the plenum, there is also included air flow distributors within the plenum spaced from the air filter and opposite the outlet ports, the air flow distributors comprising a series of plates extending normal to the skirt continuation in skirt continuation supported relation or the air flow distributors comprise a series of plates extending normal to the air filter frame in air filter frame supported relation, the outlet ports include a pair of laterally spaced outlet ports and a pair of longitudinally spaced outlet ports, and the baffle structures include a pair of laterally opposed baffle structures that have a V-shape in a plane parallel to the plane of the outlet ports, the V-shape being open to the motorized fan, and the baffle structures include a pair of longitudinally opposed baffle structures that triangular in cross-section in a plane parallel to the plane of the outlet ports, the baffle structure bases being immediately adjacent their respective ports.

In a further embodiment wherein the fan filter unit is substantially even-sided, the invention provides a high filtering efficiency, low energy, low heat output, low noise fan filter unit in which the enclosure side walls are of substantially the same length, the baffle structures being triangular in cross section and having their bases immediately adjacent their respective ports.

In yet a further embodiment the invention provides a ceiling-suspendable, high filtering efficiency, low energy, low noise fan filter unit for flowing air filtered through a high efficiency particulate air filter into a room, the filter fan unit comprising a generally horizontally disposed longitudinally and laterally extended enclosure for a centrally positioned motorized fan from which a supply of pressurized air is circularly distributed, the enclosure having
    a top wall blocking air ingress into the enclosure except via the motorized fan,
    an air impervious side wall, and
    a bottom wall defining the upper boundary of a plenum below the enclosure, the enclosure being adapted to sealably mount an air filter unit comprising an air filter pack sealably mounted in a frame to define the lower boundary of the plenum,
    the bottom wall further defining
        a first set of spaced outlet ports and a second set of spaced outlet ports disposed at right angles to the first set of outlet ports,
            the outlet ports communicating the interior of the enclosure with the plenum,
            the outlet ports being sized and distributed to allocate portions of the pressurized air supply to laterally opposite and longitudinally opposite locations in the plenum for substantially uniform pressure air flow into the plenum,
    the enclosure having disposed therein a generally vertical baffle structure immediately adjacent each outlet port extending normal to the plane of the outlet port and horizontally spaced from the motorized fan,
        each baffle structure extending from the enclosure bottom wall vertically a height of at least 25% of the distance between the bottom wall and the enclosure top wall for at least the transverse extent of its adjacent port along the side wall,
        the enclosure walls and baffle structures having sound-deadening surfaces where contacted with flowing air,
whereby the pressurized air flows from the ports is linear and free of reversal in flow direction within the enclosure and within the ports.

In this and like embodiments, the enclosure can be rectangular or square with have four substantially equal length wall sections forming the side wall. Typically, one of the spaced ports is located at each wall section and substantially intermediate the ends thereof, the outlet port being generally rectangular and substantially abutting its wall section, at each outlet port the baffle structure is generally triangular in horizontal cross-section for the height of the baffle structure, with the base of the triangle substantially abutting its adjacent outlet port and at least equaling in its horizontal extent the horizontal extent of the adjacent outlet port, there is further included a filter pack having a pack of about 5 inches in depth at a density of about 5–7 pleats per inch, a ΔP of about 0.27 inch of water gauge at 100 FPM, and a filtering efficiency of about 99.999% at 0.12 micron particles, the fan filter unit having an energy consumption of about 100 watts, air flows of about 90 FPM through the filter pack, and a heat output of approximately 200 BTU/hour.

Further in this and like embodiments, a secondary baffle or air flow distributor can be disposed substantially opposite each outlet, the distributor having air passages comprising a plurality of air-passing apertures, such as slots or openings of circular, oblong or other polygonal shape.

BRIEF DESCRIPTION OF THE DRAWINGS

The invention will be further described in conjunction with the attached drawings in which.

DETAILED DESCRIPTION

Figure 1:
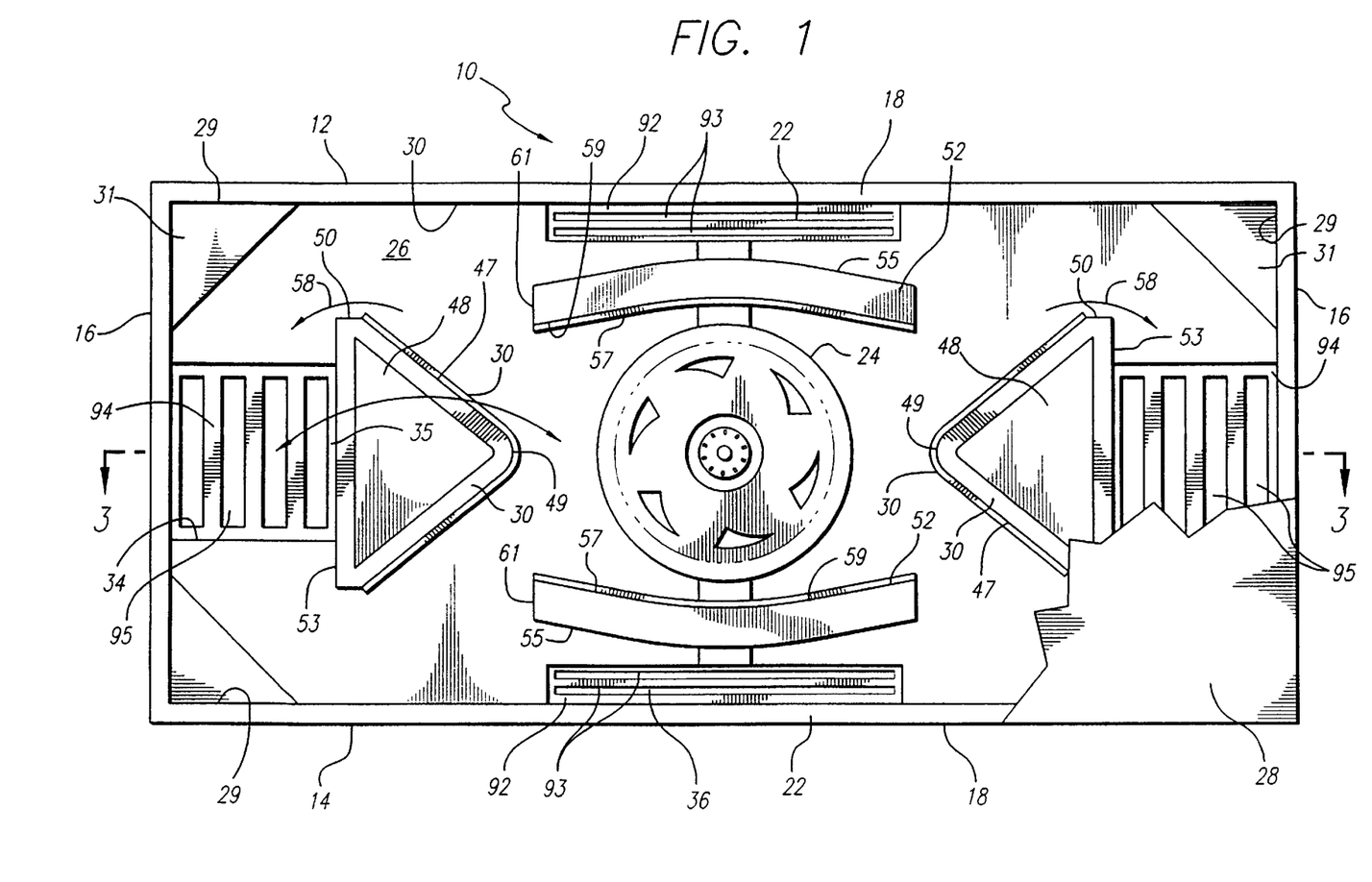
FIG. 1 is a top plan view of the fan filter unit with the top wall partially broken away to show the underlying parts.
Figure 2:
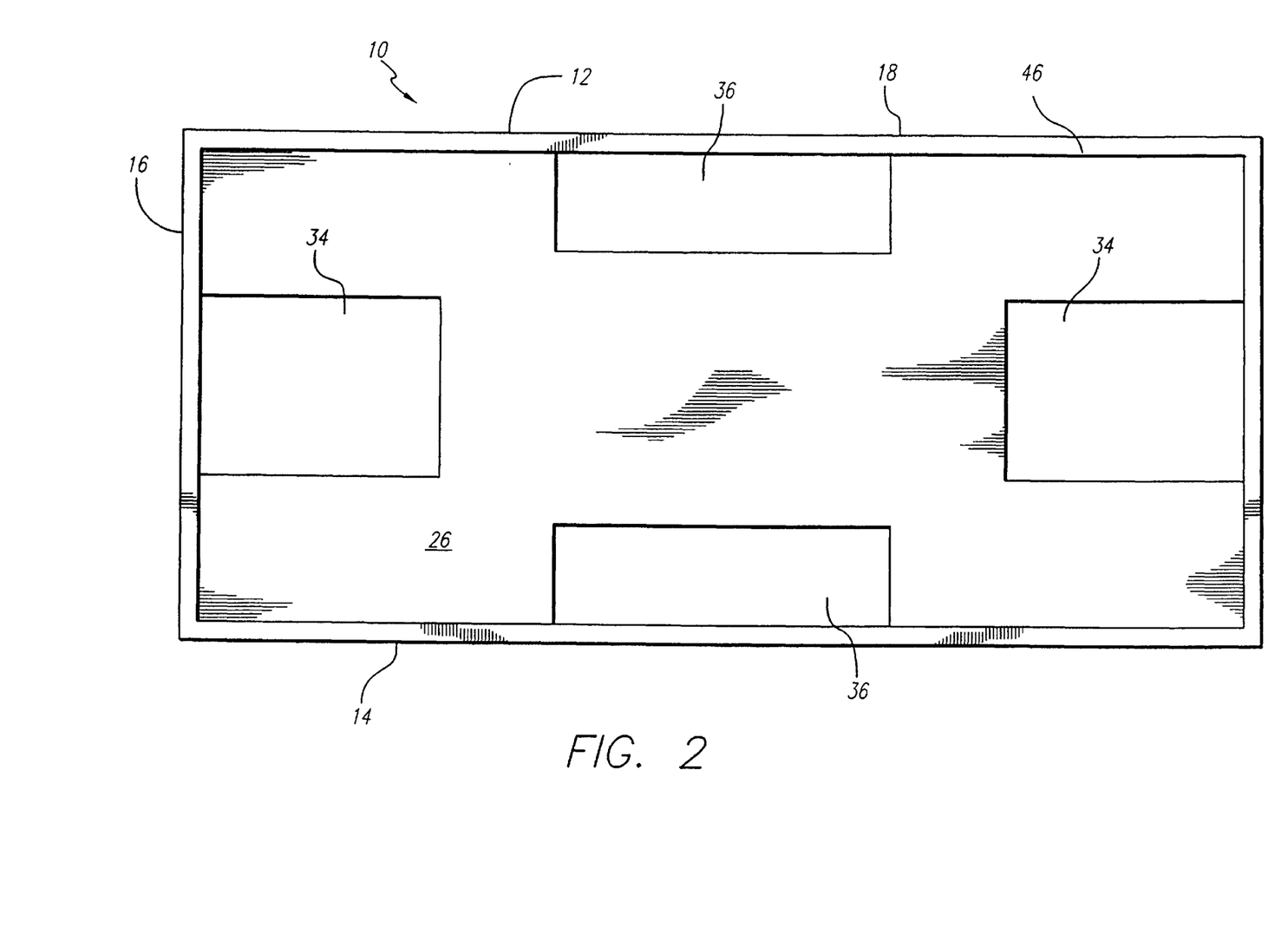
FIG. 2 is a bottom plan view of the fan filter unit without the attachment of the filter unit.
Figure 3:
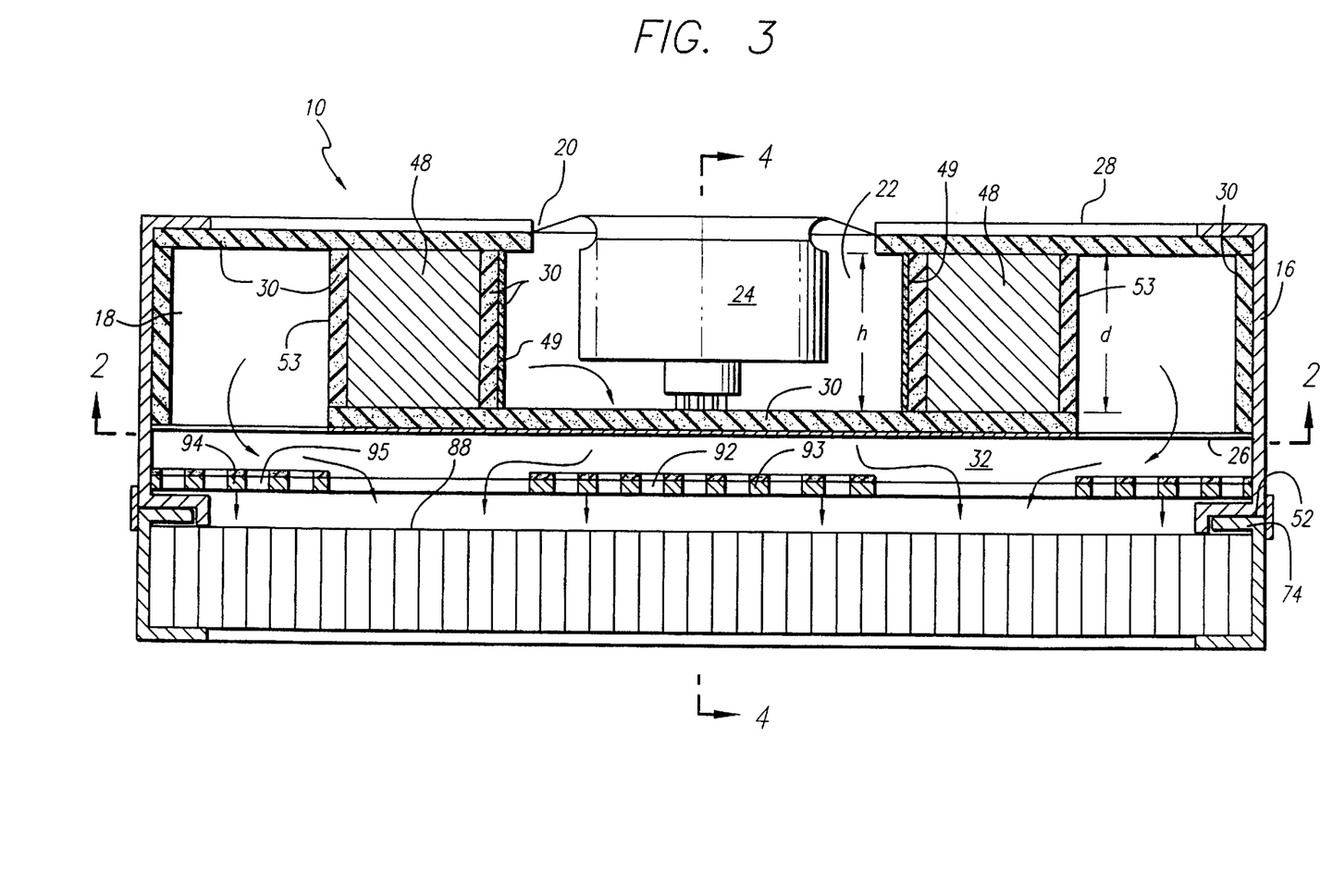
FIG. 3 is a view in vertical cross-section along the long axis of the fan filter unit and attached filter unit.

With particular reference now primarily to FIGS. 1–4, the invention fan filter unit 10 provides for flow of filtered air into a space or room (not shown) and comprises a generally rectangular enclosure 12 having a wall 14 with, in this embodiment, relatively shorter end portions 16, relatively longer side portions 18 connecting the end portions, and an Intermediate portion 22 connected to and spaced from the end portions and the side portions. A fan and motor combination 24 is mounted in the enclosure 12 opposite the enclosure intermediate portion 22. A bottom wall 26 is secured to the side wall, as is a top wall 28 that cooperates with the other walls in enclosing the enclosure 12. Bottom wall 26 defines the upper wall of plenum 32 (FIG. 3). Bottom wall 26, top wall 28 and side wall 14 define the enclosure 12 shown here as rectangular but which can be of another shape, see FIG. 9. Enclosure 12 is of a predetermined height and generally encloses the fan and motor combination 24 mounted therein. There is an inlet 20 into the enclosure 12 formed centrally of the top wall 28 through which air is drawn to the motorized fan 24, e.g. using an external rotor motor blower having a nominal 1 amp draw at 110 VAC/60 Hz, and over 750 CFM at zero static pressure. All walls are covered with sound-absorbing material 30 within the enclosure 12. Corners 29 of the enclosure 12 are filled with sound-dampened wedges 31 to limit turbulence in the air flow and noise.

A plurality of perimetrically distributed outlet ports 34, 36, are pierced through the enclosure bottom wall 26 from the enclosure 12 to the plenum 32 to provide for flow of pressurized air from the fan and motor combination 24 into the plenum. Laterally spaced ports 34 are provided at the longer side wall portions 18, and longitudinally spaced ports 36 at the shorter end wall portions 16. The ports 34, 36 are sized in depth (extent of opening from the adjacent wall portion into the enclosure) and width (extent of opening along the adjacent wall portion) to permit substantially untrammeled air flow free of back pressure attributable to the outlet port. The ports can have any configuration permitting free air flow. Air flows of a nominal 90 FPM are realized, with an energy consumption of about 100 watts, at a filtering efficiency of 99.999% at 0.12 micron particles using a 5 inch deep filter pack of 5–7 pleats per inch where the filter pack has a $\Delta P$ of 0.27 inch of water gauge at a velocity of 100 FPM.

Within the enclosure 12 and adjacent the respective outlet openings 34, 36 a series of baffle structures 48, 52 are provided. Baffle structures 48 comprise wedges of triangular horizontal cross-section, with the base 53 of the wedge substantially abutting the inwardmost edge 35 of the outlet port 36 opposite it. The baffle structure wedge base 53 extends at least the width of the outlet port 36 and preferably about 5 to 20% more than that width, evenly divided relative to the port. Baffle structures 48 covered with further sound damping material 30 such as a sound-absorbing foam, are arranged as shown with their leading narrow edge 49 facing the inward to cut the pressurized air driven centrifugally from the fan and motor combination 24 into two parts, left and right. The baffle structures 48 are of a height h to extend the full distance d between the bottom wall 26 and the top wall 28 of the enclosure 12 so that h=d. Thus there is no air flow space between the baffle structures 48 and the enclosure top wall 28 or bottom wall 26. Air flow, accordingly, passes only around the baffle structures 48, not over or under them. The air flow, once parted by the wedge leading edge 49, is guided laterally along the wedging surfaces 47 of the baffle structures 48 and thence around the trailing edges 50 into the adjoining outlet port 36 from either side of the baffle structure; other air flows are blocked. It will be noted that the air flow is thus linear and free of reversal of flow direction within the enclosure 12 and within the outlet ports 34, 36.

Baffle structures 52 are arcuate in horizontal cross-section and positioned such that their convex sides 55 abut the laterally spaced ports 36 and their concave sides 57 oppose the fan 24. The baffle structures 52 extend a distance parallel to the side walls 18 greater than the like extent of the adjacent outlet ports 36 and preferably about 5 to 20% greater and are centered on the outlet port 36 center. Baffle structures 52 have a height h equal to the distance d between the enclosure 12 bottom wall 26 and top wall 28 and thus pass no air flow over or under themselves but only around them and laterally into the outlet ports 36. Baffle structures 52 are also covered with a sound damping material 30 such as a sound-absorbing foam. As arranged, baffles 52 guide air flow from the motorized fan 24 along a linear flow along the baffle structure face 59 and around the structure corners 61 into the outlet ports 36.

The just described fan filter unit 10 is coupled to a filter unit 60. Filter unit 60 comprises a generally rectangular frame 62 formed of walls 64, and a filter pack 66 comprised of filter media 68 sealably attached to the frame walls 64 to block flow of unfiltered air flow through the filter unit. The present invention for maximum filtering efficiency and optimum energy consumption uses a filter pack 66 comprised preferably of filter media pleats of about 5 inches in depth, with no separators between the successive pleats and a pleat density of about 5–7 pleats per inch. Other sizes, densities, styles and types of HEPA, UPLA or other high efficiency filter can be used with commensurate results.

Filter unit 60 has a perimetrical flange 72 (exaggerated in this view for clarity) inwardly turned around the top of its walls 64. Fan filter unit 10 has a mating inwardly turned flange 74 (also exaggerated) on a skirt continuation 76 of the fan filter unit wall 14 that projects beyond the portion of wall 14 that encloses enclosure 12. As shown in FIG. 3, fan filter unit 10 flange 74 overlies the upper flange 72 of the filter unit 60. The fan filter unit 12 and filter unit 60 are fastened together by bolts or screws, or by a tape that doubles as a sealing tape 78 pressed over the joint 82 between the units and onto the edge margins 84, 86 of the joint.

Figure 4:
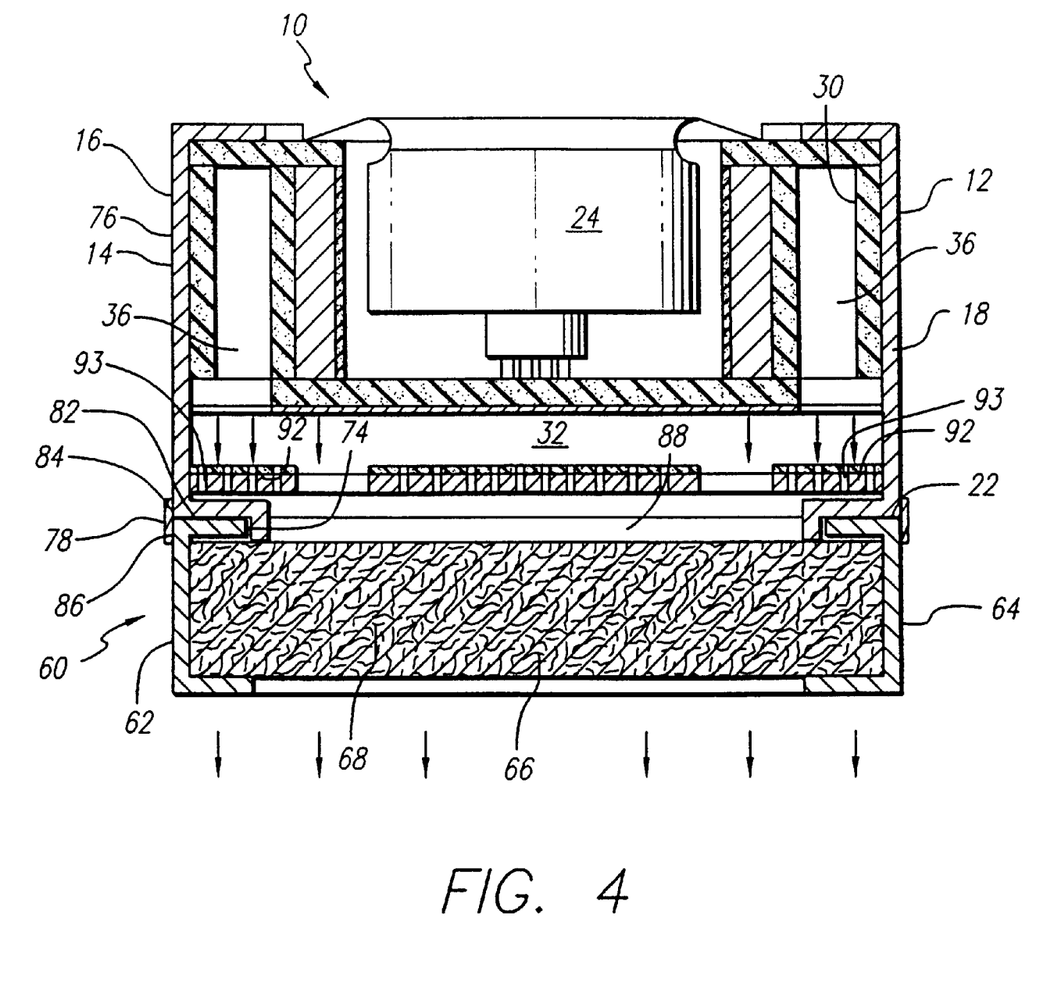
FIG. 4 is a view taken on line 4—4 in FIG. 3.

The filter pack 66 upper surface 88 defines with the fan filter unit bottom wall 26 the plenum 32. Air flow from the outlet ports 34, 36 enters the plenum 32 and encountering the lower flow rates of the filter pack 66 establishes an increased air pressure within the plenum. To better ensure the even flow of air in the plenum 32 to the filter pack upper surface 88, a series of air flow distributors 92, 94 are provided. Air flow distributors 92 are flat plates, typically of aluminum, that are cantilevered or otherwise supported at the laterally opposed outlet ports 36 in the air flow stream through the ports 34 in position to deflect somewhat the downcoming air from immediately passing to the filter pack upper surface 88 in a manner that would unbalance the air pressure on that surface in favor of surface areas immediately opposite the outlets 34, 36. Distributors 92 and 94 are similar in construction, support and function, but for the air flow downcoming from the longitudinally opposed outlet ports 34 in the case of distributor 94. In FIGS. 3 and 4, the air flow distributors 92, 94 are shown attached to the fan filter unit wall skirt continuation 76 just above the inturned flange 74, so that the fan filter unit 10 carries the air flow distributors 92, 94. Preferably the air flow distributors 92, 94 are apertured with slots 93, 95 as shown FIG. 1 (viewed through outlet ports 34, 36).

Figure 5:
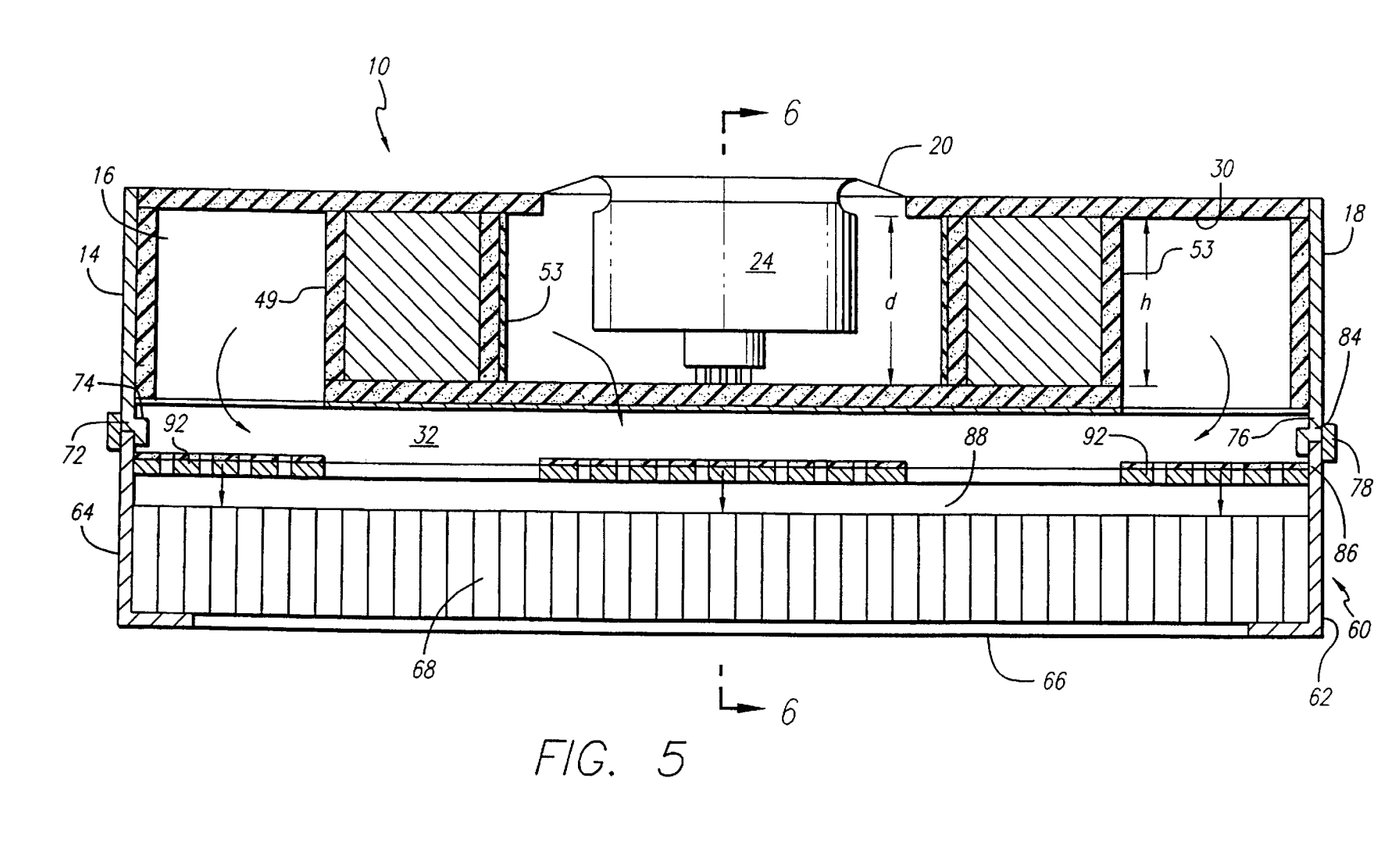
FIG. 5 is a view like FIG. 3 of an alternate form of the invention.
Figure 6:
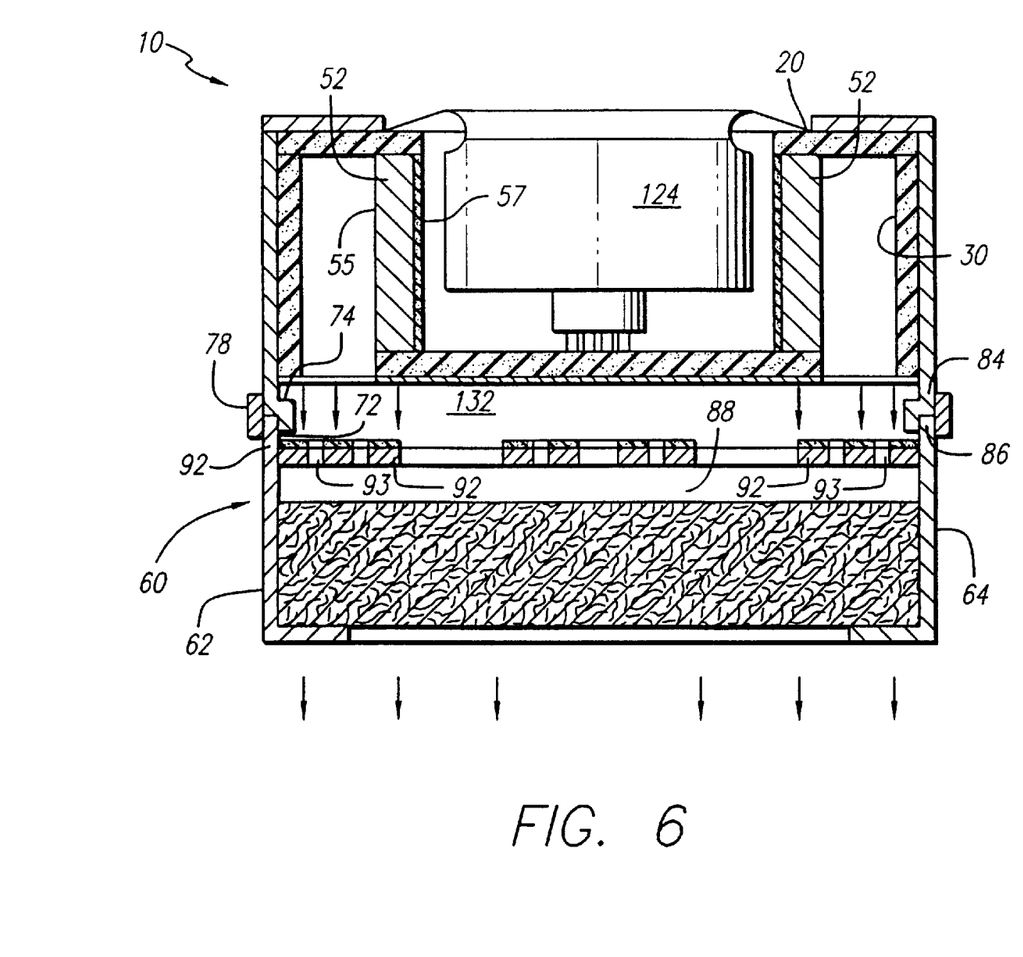
FIG. 6 is a view taken on line 6—6 in FIG. 5.
Figure 7:
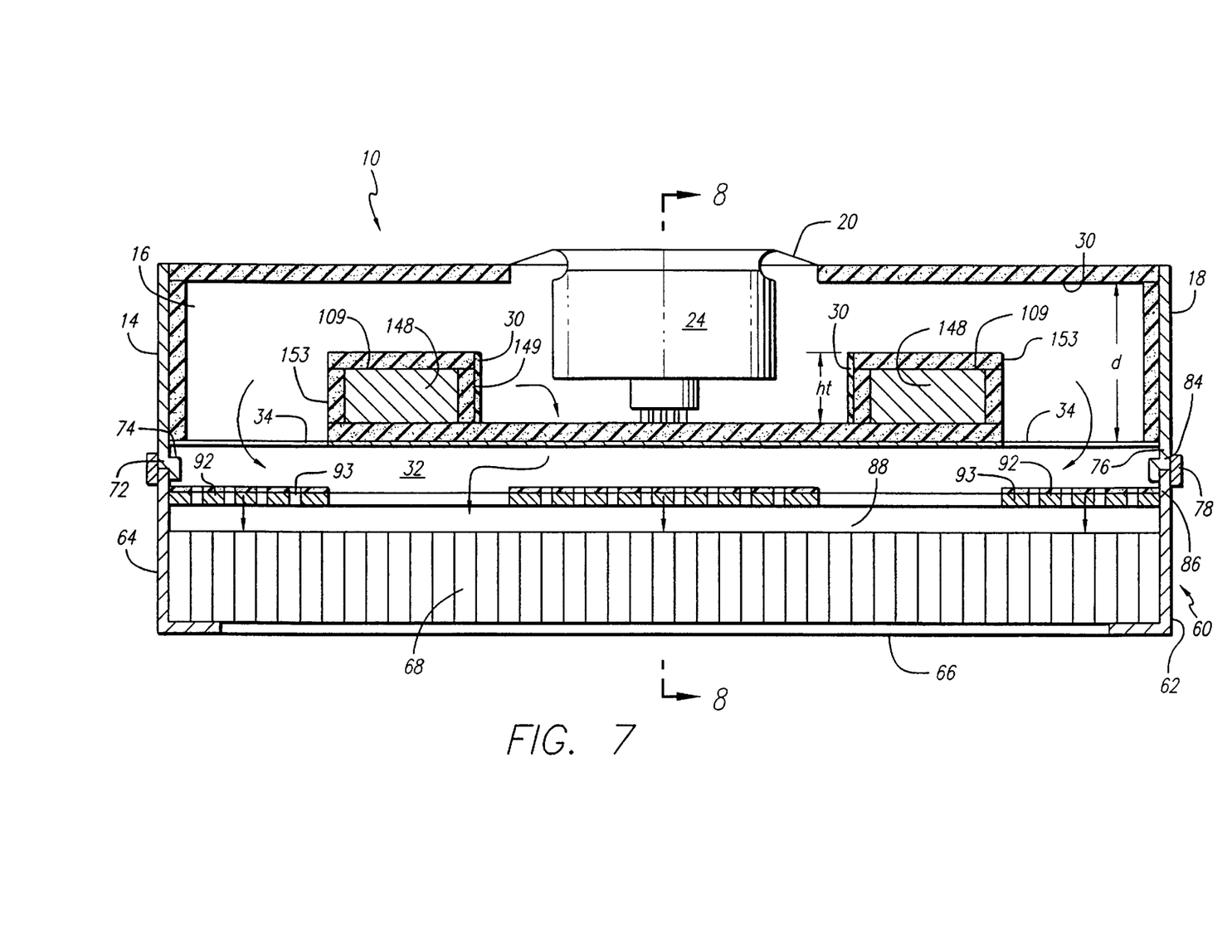
FIG. 7 is a view like FIG. 5 of a further alternate form of the invention.
Figure 8:
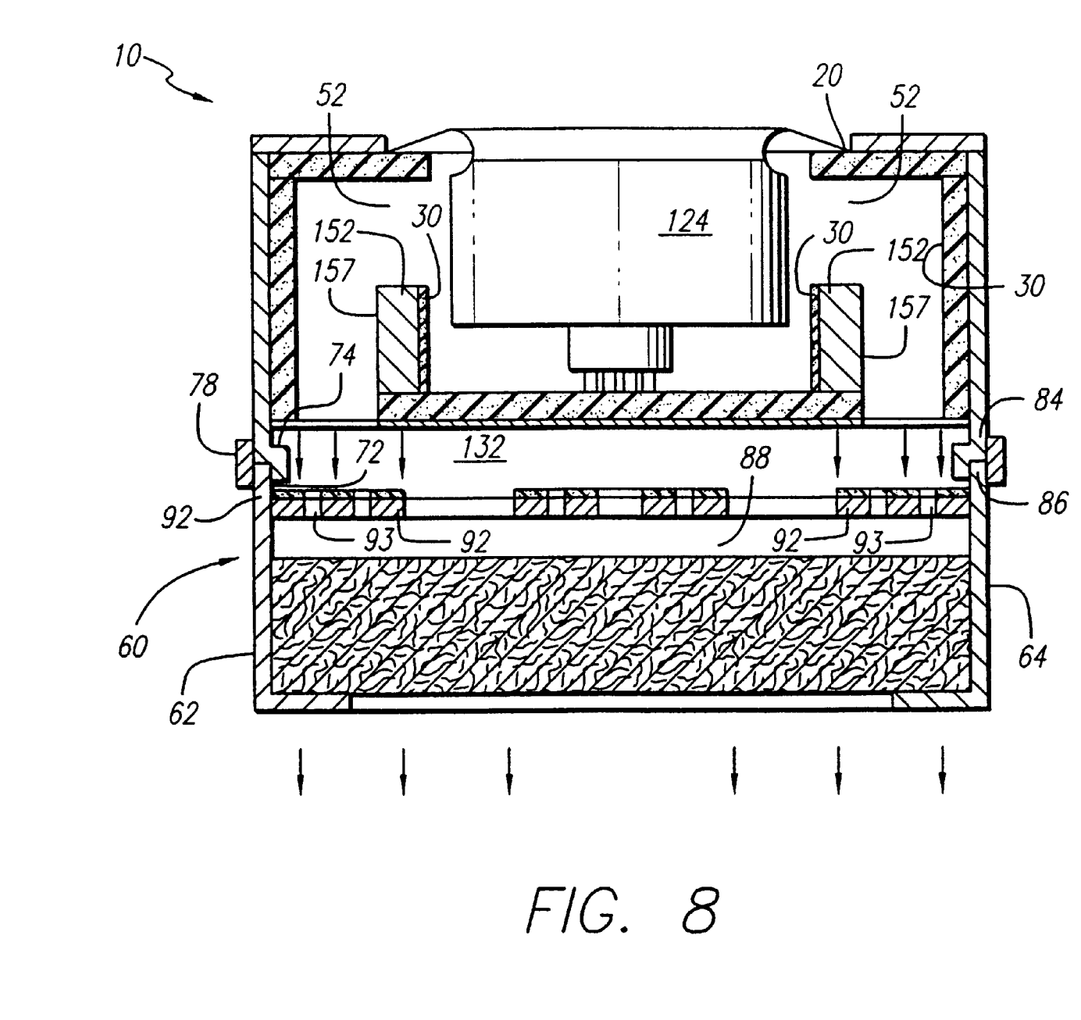
FIG. 8 is a view taken on line 8—8 in FIG. 7.

In FIGS. 5 and 6, in which like parts are given like numerals, the air flow distributors 92, 94 are shown attached to the filter unit 60, below the joint 82 between the fan filter unit 10 and the filter unit 60 so that the filter unit carries the air flow distributors as may be desirable in certain applications or for manufacturing reasons In FIGS. 7 and 8, in which like parts are given like numerals, an embodiment is shown in which the baffle structures 148, 152 are of less than full height within the enclosure 12, so that air flow is not only around the edges of the baffles, but also over the top, as a waterfall, into the outlet ports 34, 36. Like the previous embodiments, the air flow in this embodiment is non-reversing within the enclosure 12 and the ports 34, 36. More particularly, within the enclosure 12 and adjacent the respective outlet openings 34, 36 a series of baffle structures 148, 152 are provided. Baffle structures 148 comprise wedges of triangular horizontal cross-section, with the base 153 of the wedge substantially abutting the outlet port 36 opposite it. The baffle structure wedge base 153 extends at least the width of the outlet port 36 and preferably about 5 to 20% more than that width, evenly divided relative to the port. Baffle structures 148 covered with further sound damping material 30 such as a sound-absorbing foam, are arranged as shown with their leading narrow edge 149 facing the inward to cut the pressurized air driven centrifugally from the fan and motor combination 24 into two parts, left and right. The baffle structures 148 are of a height ht to extend about one-half the full distance d between the bottom wall 26 and the top wall 28 of the enclosure 12 so that ht=50%×d. The height ht can be from about 25% of d up to 75% or as shown in previous embodiments 100% of d (ht=h=d). In this embodiment there is more or less air flow space between the baffle structures 148 and the enclosure top wall 28. Air flow, accordingly, passes not only around the baffle structures 148, but also over them. The air flow parted by the wedge leading edge 149, is guided laterally along the wedging surfaces of the baffle structures 148 and thence around the structure into the adjoining outlet port 36 from either side of the baffle structure. Air flow is also passed over the upper edges 109 of the baffle structures 148 and mixes with the lateral flow coming around the vertical edges. It will be noted that the air flow is thus linear and free of reversal of flow direction within the enclosure 12 and within the outlet ports 34, 36.

Baffle structures 152 are arcuate in horizontal cross-section (Cf. Item 52 in FIG. 1) and positioned such that their convex sides 155 abut the laterally spaced ports 36 and their concave sides 157 oppose the fan 24. The baffle structures 152 extend a distance parallel to the side walls 18 greater than the like extent of the adjacent outlet ports 36 and preferably about 5 to 20% greater and are centered on the outlet port 36 center. Baffle structures 152 too have a height ht equal to less than the distance d between the enclosure 12 bottom wall 26 and top wall 28, ranging from a least about 25% of d to 75% or more up to 100% as in previous embodiments. It is not necessary that the height ht of the baffle structures 152 be equal to the height ht of the other baffle structures 148 within the same enclosure 12. As described for baffle structures 148, structures 152 pass air flow over themselves as well laterally into the outlet ports 36. Baffle structures 152 are also covered with a sound damping material 30 such as a sound-absorbing foam. As arranged, baffles 152 guide air flows from the motorized fan 24 along a linear flow along the baffle structure and around the structure corners and laterally into the outlet ports 36, as well as over the upper edges 111 and linearly into the ports 36.

Figure 9:
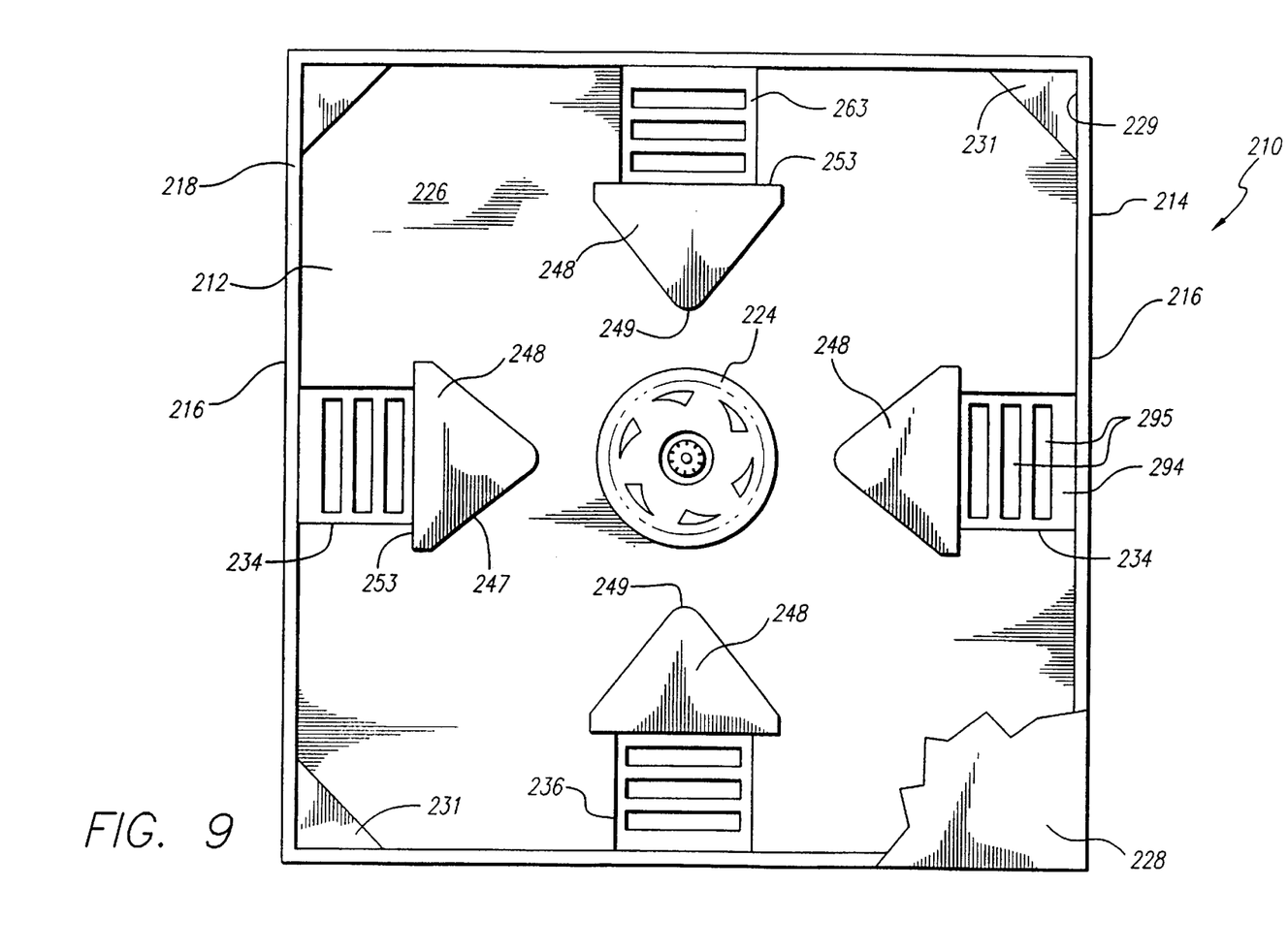
FIG. 9 is a top plan view of a further alternate form of the invention, the top wall having been removed.

In FIG. 9, in which like parts have like numerals plus 200, a square form of the invention fan filter unit 210 is shown. The motorized fan 224 is supported in the center of the enclosure 212 formed of top wall 228, bottom wall 226, and sidewalls 214. Baffle structures 248, all triangular in horizontal cross section, are used to divide and guide the air flow to enter outlet ports 234, 236 laterally only and to pass the air flow linearly along the baffle structure side walls 247 without reversal of direction within the enclosure 212 or the outlet ports 234, 236. A filter unit (not shown) congruent with the fan filter unit 210 is attached to the fan filter unit as in previous embodiments.

The present invention thus provides improved fan filter units that are more filtering efficient, more energy efficient to lower electrical costs, less noise generating for a quieter workplace, and simply installed. The fan filter units have a system of baffles arranged to conduct linear air flow laterally and vertically into outlet ports from the fan enclosure and to block reverse flows in the enclosure and in the ports. The fan filter unit achieves increased filtering efficiency through the use of separator-less filter media packs of increased depth and greater pleat density, and more energy efficiency through the noted baffle design so that energy consumption is about 100 watts and heat output is low at about 200 BTU/hour. The fan filter units comprise a mating fan filter unit enclosure and filter media containing frame that are conjoined above the filter media to define a plenum, one or the other of the enclosure and filter frame carrying air flow distributors opposite the outlet ports. The foregoing objects are thus met.

I claim:

1. A high filtering efficiency, low energy, low noise fan filter unit for flowing air filtered through a high efficiency particulate air filter into a clean room, said fan filter unit being normally horizontally disposed and comprising a longitudinally and laterally extended enclosure having an air inlet and an air outlet, a high efficiency particulate air filter unit in air-flow communication with the enclosure outlet across a plenum defined by the enclosure and the air filter unit, a motorized fan in air flow communication with the enclosure inlet and the outlet, said fan being supported centrally within the enclosure, said enclosure outlet comprising a longitudinally spaced ports and laterally spaced ports, said ports lying in a normally horizontal common port plane below the fan and collectively being of sufficient cross-sectional area to pass without substantial back pressure the air flow generated by the motorized fan, individual baffle structures extending substantially normal to the common port plane adjacently before each said port and between the fan and the port, the baffle structures being arranged to block all direct air flow from the motorized fan into the ports, whereby air flow from the ports is linear and free of reversal in flow direction within said enclosure and within said ports.

2. The high filtering efficiency, low energy, low noise fan filter unit according to claim 1, in which said enclosure comprises side walls, a top wall defining said inlet and a bottom wall defining said outlet ports, said air filter unit comprising a frame attached to said fan unit, and a filter, said filter being spaced from said enclosure bottom wall in plenum-defining relation.

3. The high filtering efficiency, low energy, low noise fan filter unit according to claim 2, in which said enclosure side walls are of substantially the same length, said longitudinally spaced baffle structures being triangular in cross section and having their bases immediately adjacent their respective ports.

4. The high filtering efficiency, low energy, low noise fan filter unit according to claim 1, in which said baffle structures extend from said enclosure bottom wall vertically a height sufficient to effect said blocking of all direct air flow from said motorized fan into said ports.

5. The high filtering efficiency, low energy, low noise fan filter unit according to claim 4, in which said baffle structures extend from said enclosure bottom wall vertically a height of at least 25% of the distance between said bottom wall and said enclosure top wall.

6. The high filtering efficiency, low energy, low noise fan filter unit according to claim 4, which said baffle structures extend from said enclosure bottom wall to said enclosure top wall.

7. The high filtering efficiency, low energy, low noise fan filter unit according to claim 1, in which said laterally spaced ports have individual baffle structures of a V-shape in a plane parallel to the plane of said ports, said V-shape being open to said motorized fan.

8. The high filtering efficiency, low energy, low noise fan filter unit according to claim 1, in which said longitudinally spaced baffle structures are triangular in cross-section in a plane parallel to the plane of said outlet ports, the baffle structure bases being immediately adjacent their respective ports.

9. The high filtering efficiency, low energy, low noise fan filter unit according to claim 8, in which said laterally spaced ports have individual baffle structures of a V-shape in a plane parallel to the plane of said ports, said V-shape being open to said motorized fan.

10. A high filter efficiency, low energy, low noise fan filter unit for flowing air filtered through a high efficiency particulate air filter into a clean room comprising an enclosure having side walls, a top wall defining an air inlet and a bottom wall defining a plurality of laterally and longitudinally spaced outlet ports, said side walls being adapted to attach an air filter unit including a filter to be spaced from said enclosure bottom wall in plenum defining relation, and a plurality of air flow distributors supported between said filter unit bottom wall and said air filter, said air flow distributors being apertured and arranged to guide air flow from each said outlet port to said filter.

11. The high filter efficiency, low energy, low noise fan filter unit according to claim 10, including also an air filter unit, and in which said enclosure is separately formed from said air filter unit, said enclosure having a skirt continuation of said side walls beyond said bottom wall for enclosing said plenum, said air flow distributors being supported by said enclosure skirt within said plenum.

12. The high filter efficiency, low energy, low noise fan filter unit according to claim 10, including also an air filter unit, and in which said enclosure is separately formed from said filter unit, said enclosure having a skirt continuation of said side walls beyond said bottom wall enclosing said plenum, said air flow distributors being supported by said air filter unit within said plenum.

13. The high filter efficiency, low energy, low noise fan filter unit according to claim 10, including also an air filter unit that comprises a unit frame and a filter comprising a filter media pack sealably contained within said frame, said filter media pack having no separators, a pleat depth of about 5 inches and a pleat density of about 5–7 pleats per inch.

14. A high filtering efficiency, low energy, low noise fan filter unit for flowing air filtered through a high efficiency particulate air filter into a clean room, said fan filter unit comprising a longitudinally and laterally extended enclosure comprising four sides, a top wall and a bottom wall, a central air inlet in said top wall, a series of perimetrically distributed air outlet ports through said bottom wall, a skirt continuation of said enclosure side walls beyond said bottom wall, a high efficiency particulate air filter unit comprising a frame attached to said enclosure skirt continuation, a high efficiency particulate air filter sealably mounted within said frame and defining a plenum with said enclosure bottom wall, a motorized fan in air flow communication with said enclosure inlet and said plenum through said outlet ports, said fan being supported centrally within said enclosure, said outlet ports collectively being of sufficient cross-sectional area to pass without substantial back pressure the air flow generated by said motorized fan, an individual baffle structure adjacent each said outlet port, said baffle structures extending vertically a height equal to the distance between said enclosure bottom wall and said enclosure top wall, whereby said outlet ports are closed by adjacent baffle structure to all but lateral entry of air flow from said motorized fan, air flow from said ports thereby being linear and free of reversal in flow direction within said enclosure and within said ports.

15. The high filtering efficiency, low energy, low noise fan filter unit according to claim 14, in which said enclosure side, top and bottom walls and said baffle structures define air directing surfaces, said air directing surfaces being covered with sound-absorbing medium.

16. The high filtering efficiency, low energy, low noise fan filter unit according to claim 14, in which said enclosure skirt continuation terminates in an inwardly turned flange, said filter unit frame having a shoulder abutting said flange, and including also a fastener attaching said filter unit shoulder to said skirt continuation flange in abutting relation.

17. The high filtering efficiency, low energy, low noise fan filter unit according to claim 14, in which said outlet ports are sized and located to direct motorized fan pressurized air within said enclosure substantially uniformly to said plenum.

18. The high filtering efficiency, low energy, low noise fan filter unit according to claim 17, including also air flow distributors within said plenum spaced from said air filter and opposite said outlet ports.

19. The high filtering efficiency, low energy, low noise fan filter unit according to claim 18, in which said air flow distributors comprise a series of plates extending normal to said skirt continuation in skirt continuation supported relation.

20. The high filtering efficiency, low energy, low noise fan filter unit according to claim 18, in which said air flow distributors comprise a series of plates extending normal to said air filter frame in air filter frame supported relation.

21. The high filtering efficiency low energy, low noise fan filter unit according to claim 18 in which said outlet ports include a pair of laterally spaced outlet ports and a pair of longitudinally spaced outlet ports, and said baffle structures include a pair of laterally opposed baffle structures that have a V-shape in a plane parallel to the plane of said outlet ports, said V-shape being open to said motorized fan.

22. The high filtering efficiency, low energy, low noise fan filter unit according to claim 21, in which said baffle structures include a pair of longitudinally opposed baffle structures that triangular in cross-section in a plane parallel to the plane of said outlet ports, said baffle structure bases being immediately adjacent their respective ports.

23. The high filtering efficiency, low energy, low noise fan filter unit according to claim 18, in which said enclosure side walls are of substantially the same length, said baffle structures being triangular in cross section and having their bases immediately adjacent their respective ports.

24. The high filtering efficiency, low energy, low noise fan filter unit according to claim 18, in which said air filter unit filter comprises a filter media pack sealably contained within said frame, said filter media pack having no separators, a pack depth of about 5 inches and a pleat density of about 5–7 pleats per inch.

25. A ceiling-suspendable, high filtering efficiency, low energy, low noise fan filter unit for flowing air filtered through a high efficiency particulate air filter into a room,
said filter fan unit comprising a generally horizontally disposed longitudinally and laterally extended enclosure for a centrally positioned motorized fan from which a supply of pressurized air is circularly distributed,
said enclosure having
a top wall blocking air ingress into said enclosure except via said motorized fan,
an air impervious side wall, and
a bottom wall defining the upper boundary of a plenum below said enclosure, said enclosure being adapted to sealably mount an air filter unit comprising an air filter pack sealably mounted in a frame to define the lower boundary of said plenum,
said bottom wall further defining
a first set of spaced outlet ports and
a second set of spaced outlet ports disposed at right angles to said first set of outlet ports,
said outlet ports communicating the interior of said enclosure with said plenum,
said outlet ports being sized and distributed to allocate portions of said pressurized air supply to laterally opposite and longitudinally opposite locations in said plenum for substantially uniform pressure air flow into said plenum, said enclosure having disposed therein a generally vertical baffle structure immediately adjacent each said outlet port extending normal to the plane of said outlet port and horizontally spaced from said motorized fan, each said baffle structure extending from said enclosure bottom wall vertically a height of at least 25% of the distance between said bottom wall and said enclosure top wall for at least the transverse extent of its adjacent port along said side wall, said enclosure walls and baffle structures having sound-deadening surfaces where contacted with flowing air, whereby said pressurized air flows from said ports is linear and free of reversal in flow direction within said enclosure and within said ports.

26. The fan filter unit according to claim 25, in which said enclosure is square and has four substantially equal length wall sections forming said side wall, one of said spaced ports being located at each wall section and substantially intermediate the ends thereof.

27. The fan filter fan unit according to claim 25, in which each said outlet port is generally rectangular and substantially abuts its said wall section.

28. The fan filter unit according to claim 27, including also opposite each said outlet an air flow distributor comprising a plurality of air-passing apertures.

29. The fan filter unit according to claim 28, in which said passages comprise slots.

30. The fan filter unit according to claim 25, in which at each said outlet port said baffle structure is generally triangular in horizontal cross-section for the height of said baffle structure, with the base of the triangle substantially abutting its adjacent outlet port and at least equaling in its horizontal extent the horizontal extent of said adjacent outlet port.

31. The fan filter unit according to claim 25, including also a filter pack having pleats of about 5 inches in depth at a density of about 5–7 pleats per inch, a $\Delta P$ of about 0.27 inch of water gauge at 100 FPM, and a filtering efficiency of about 99.999% at 0.12 micron particles, said fan filter unit having an energy consumption of about 100 watts and air flows of about 90 FPM through the filter pack.

* * * * *